United States Patent [19]

Merlack et al.

[11] 4,176,245
[45] Nov. 27, 1979

[54] WIRE SPLICE INSULATORS

[75] Inventors: William A. Merlack; John H. Royston, both of Pittsburgh, Pa.

[73] Assignee: Royston Laboratories, Inc., Pittsburgh, Pa.

[21] Appl. No.: 897,353

[22] Filed: Apr. 18, 1978

[51] Int. Cl.² .................................... H02G 15/08
[52] U.S. Cl. .................... 174/92; 174/71 R; 174/76; 174/138 F
[58] Field of Search ............... 174/71 R, 76, 88 R, 174/92, 138 F, 23 R, 23 C, 84 R

[56] References Cited

U.S. PATENT DOCUMENTS

| 3,214,509 | 10/1965 | Hugo | 174/84 |
| 3,879,575 | 4/1975 | Dobbin et al. | 174/92 |

Primary Examiner—Roy N. Envall, Jr.
Attorney, Agent, or Firm—Buell, Blenko & Ziesenheim

[57] ABSTRACT

A wire splice insulator for underground wire splices and the like is provided in the form of a pair of substantially rigid flat base members in side by side relationship, a sheet of soft conformable self-sealing cohesive elastomer beneath and adhered to said base members, a dome extending outwardly from each said base member and elastomer sheet generally centrally of the base member and forming a cavity in the base member and elastomer sheet, a plurality of semi-tubular shields in each base member and elastomer sheet extending from the dome to adjacent the edge of the base members and forming semi-cylindrical cavities in said base members and sheets, said domes and tubular sheathes in the pair of base members being mirror images of each other, a soft non-hardening mastic adhesive insulating material filling the cavities in the elastomer and a parting sheet on the elastomer sheet and mastic opposite the base members.

6 Claims, 5 Drawing Figures

U.S. Patent   Nov. 27, 1979   Sheet 1 of 2   4,176,245
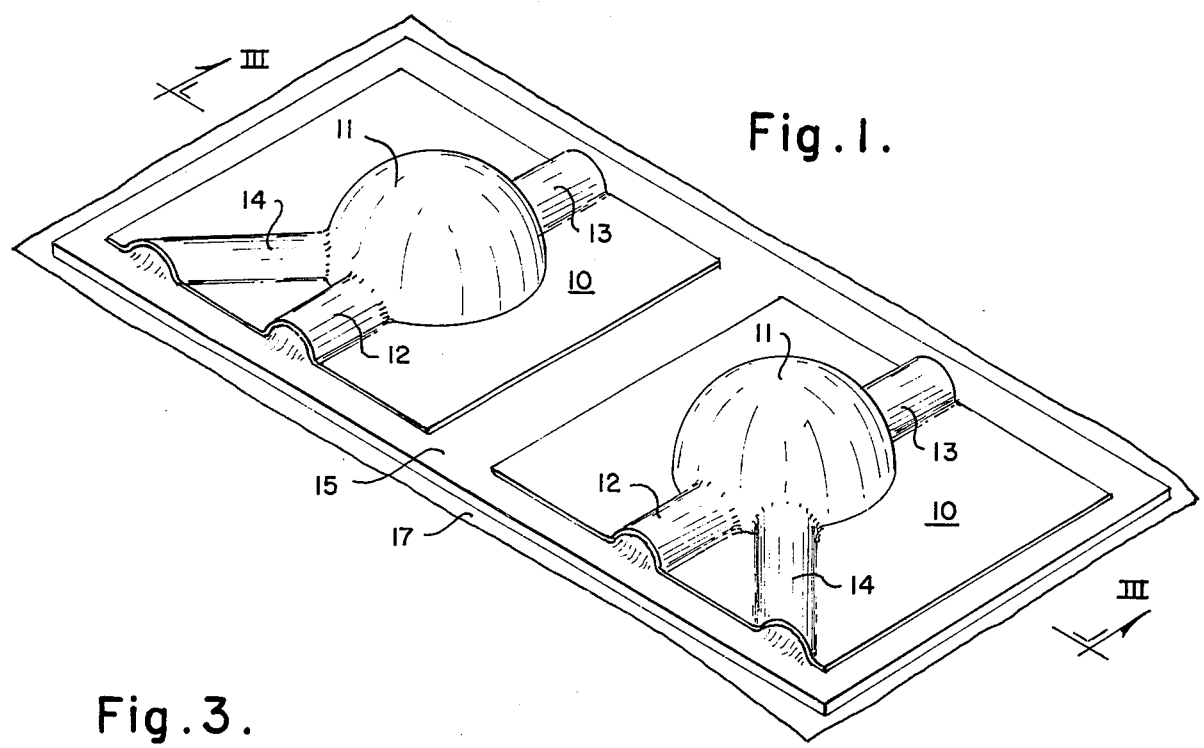
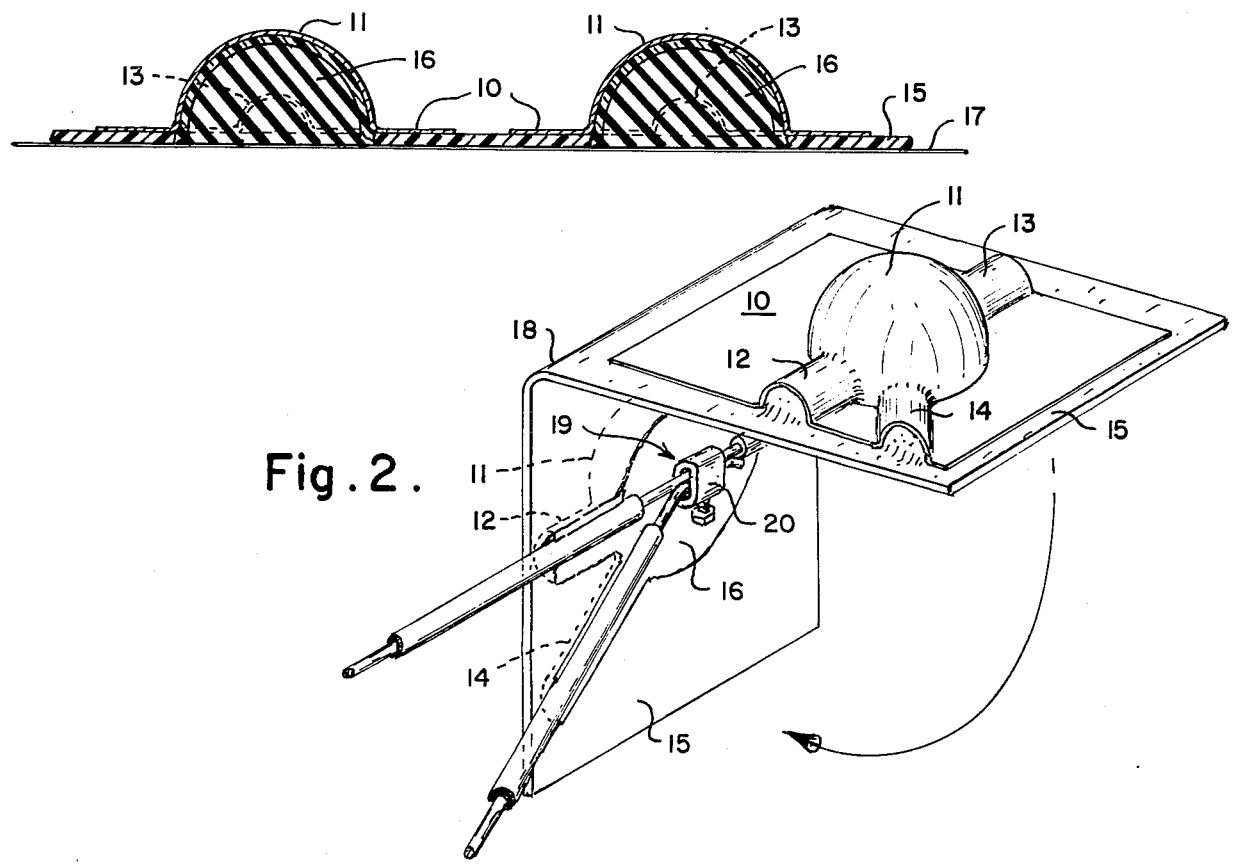

WIRE SPLICE INSULATORS

This invention relates to wire splice insulators and particularly to a quick wire splice insulator which is moisture proof and can be quickly applied under adverse conditions.

There are many situations where it is desirable to make a splice of one wire onto a continuous strand of water or moisture proof insulated wire without losing the insulating or the water or moisture proof quality of the wire. Typical of such situations exists where a single insulated main wire from a cathodic pipe protection system extends along a buried pipe line and individual connector wires are attached at one end at intervals along the pipe line and the other end is attached to the single main wire adjacent the connection to the pipe line. Such lines are used in both forms of cathodic protection of pipe lines, i.e. in the rectified current system and the high potential metal anode system. In such systems the connector wires are connected to the main wire by removing a portion of insulation from the main wire and from the end of the connector wire and fastening them together with a mechanical fastener such as the well known Burndy clamp. At this point the insulation and moisture resistant properties of the wire have been destroyed. In the past, a great variety of systems have been used in an effort to reinsulate and waterproof the connection. For example, the connection has been wrapped with pressure sensitive plastic tape alone or covered with friction tape. Another form of protective coating has been made by applying an epoxy mixture to the connection and solidifying the same. One example of such system has consisted of a resin and hardener in two separate but connecting plastic bags in which a separator between them can be broken and the two mixed in a common bag by kneading after which the bag is opened and wrapped around the connection to hold the epoxy mix in place until it hardens. In all cases of prior art insulators, the connection is very subject to damage by stones and the like during backfilling or to rupture of the coating. In addition, the epoxy systems are not practical in cold weather because of the extreme periods of time required for hardening to occur.

We have developed a wire splice insulator which can be prefabricated and applied in a matter of seconds under any conditions. Our splice insulator also provides protection against damage during back fill.

We provide a wire splice insulator made up of a pair of substantially rigid flat base members in side by side relationship, a dome extending outwardly from generally the center of each base member and forming a cavity on the opposite side, a plurality of semi-tubular shield members formed in said base member and extending from the dome to at least adjacent an edge of the base member, forming semi-cylindrical cavities, said shield members in each pair of base members being the mirror image of one another, a sheet of soft, conformable, self-sealing cohesive elastomer carrying said base members in side by side mirror image relationship, said elastomer being fitted into the cavities in said base members, a soft, nonhardening mastic adhesive insulating material filling the cavities in the elastomer and a parting sheet on the opposite side of said elastomer sheet from said base members covering said sheet and mastic. Preferably the base member is formed of a rigid plastic material such as polyethylene, polypropylene, polycarbonate, polystyrene, polyvinylchloride, polyolefin, cellulose acetate, cellulose butyrate, polyester, copolymers of ethylene and propylene alone or mixed with polyisobutylene and the like materials. The dome and tubular shield portions are formed in the base material by any of the well known forming techniques, e.g. thermoforming, blow molding, injection molding etc. Preferably the elastomer sheet is a member from the group consisting of natural rubber, styrene butadiene rubber, butyl rubber, neoprene, nitrite rubber, ethylene propylene terpolymer and polysulfide rubber with sufficient tackifiers to maintain it in soft, conformable, tacky self-sealing condition. The mastic is preferably a soft, conformable, adhesive, non-hardening material such as "Plicoflex Filler Compound No. 200" from Plicoflex, Inc., or any other suitable bituminous or rubber material suitably compounded to remain soft and tacky. The two base members in each assembly can be separately formed or they can be formed as a single unit with a zone of weakening, such as perforations, separating them so that they can be folded together to form an insulating splice cover.

In the foregoing general description we have set out certain objects, purposes and advantages of our invention. Other objects, purposes and advantages will be apparent from a consideration of the following description and the accompanying drawings in which:

FIG. 1 is a isometric view of a wire splice insulator according to this invention;

FIG. 2 is an isometric view of a wire splice insulator about to be applied;

FIG. 3 is a section on the line III—III of FIG. 1;

Figure 4:
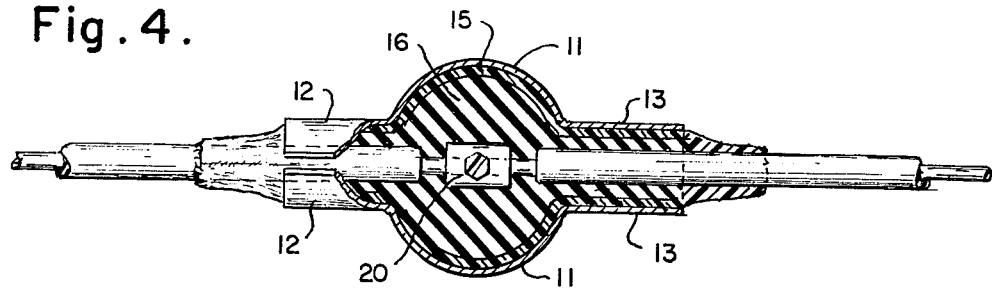
FIG. 4 is a section through a completed wire splice insulation assembly.

Referring to the drawings we have illustrated a pair of base members 10 of substantially rigid polyethylene each base member has a central generally hemispherical dome portion 11 sufficiently large so that in combination they can enclose whatever wire splicing mechanism is used. Extending from each dome are generally tubular shields 12, 13 and 14 in mirror image position, generally aligned with the dome in the positions of the wires to be spliced. The two base members 10 are carried side by side in mirror image relationship on a single sheet of soft, conformable, self-adhering self-sealing elastomer 15 which elastomer is fitted into the cavities formed by the dome 11 and tubular shields 12, 13 and 14. The cavity in the dome and in each shield within the elastomer sheet is filled with a soft non-hardening mastic adhesive 16. The elastomer sheet 15 and mastic filling 16 are covered by a disposable parting sheet 17.

In use, the parting sheet 17 is removed and the two base members 10 are folded together with the elastomer sheet 15 forming a hinge 18 over the wire splice 19 as shown in FIG. 2, with the splice and the mechanical clamp 20, where used, coming with the two opposed domes 11 and the wires running through the tubular shields 12, 13 and 14. The mastic adhesive 16 is forced into close contact with the wires and splice, forming a tight, pliable, waterproof insulating sheath surrounded by a second pliable tight sheath in the form of elastomer sheet 15 and by a relatively hard rigid cover in the form of dome 11 and tubular sheaths 12, 13 and 14 which protect against damage during back filling and mechanical handling.

Figure 5:
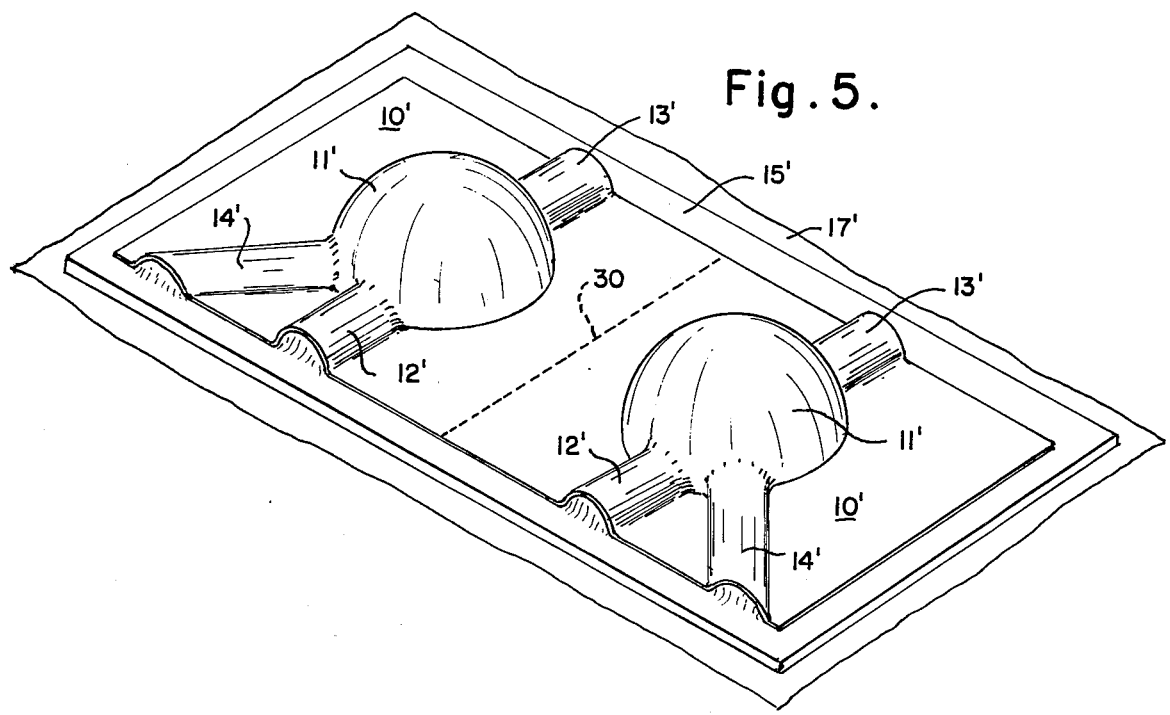
FIG. 5 is an isometric view of a second embodiment of wire splice insulator according to this invention.

In FIG. 5 we have illustrated a second embodiment of this invention in which like parts to those of FIGS. 1-4 are given like numbers with a prime sign. This embodiment differs only in that the two base members 10 are separated by a weakened portion 30, such as a line of perforations, which acts as a hinge in folding the two bases upon themselves.

In order to better understand the invention, we will set out below certain typical elastomer compositions suitable for elastomer sheet 15.

EXAMPLE I

A soft conformable natural rubber sheet having the composition:
Cross-linked natural rubber (SP-RSS)—20
High m.w. polyisobutylene (VIstanex MM)—20
Low m.w. polyisobutylene (Vistanex LM)—29
Ester of hydrogenated rosin (Staybelite)—30
Trimethyl dihydroquinoline (Agerite Resin D)—1

EXAMPLE II

A sheet made as in Example I but with a soft conformable natural rubber of the following formulation:
Low viscosity depolymenized natural rubber—100
P-quinone dioxime (GMF)—5
$PbO_2$—5
Whiting—100
d-limonene—10
Mineral Oil (Nujol)—10
Triethanolamine—2

EXAMPLE III

A sheet of soft conformable elastomer of the following formulation:
Styrene Butadiene Copolymer (SBR)—100
Glyco ester gum—75
Zinc Oxide—80
Sulfur—0.3
Tetraethyl thiuram disulfide (Ethyl Tuads)—0.3
Zinc dibutyl dithiocarbamate (Butyl Zimate)—0.3

EXAMPLE IV

A sheet of soft conformable elastomer of the following formulation:
Isoprene-isobutylene copolymer (Butyl rubber)—100
Polyisobutylene (oronite 64)—50
Zinc Oxide—5
Carbon Black—7.5
p-dinitroso benzene (Polyac)—1
Mil at 250° until the vulcanization reaction of the butyl rubber is complete

|  | B | C | D |
|---|---|---|---|
| Isoprene-isobutylene copolymer | 100 | 100 | 100 |
| Polyisobutylene | 50 | 50 | 50 |
| Zinc Oxide | 5 | 5 | 5 |
| Carbon Black | 7.5 | 50 | 100 |
| p-dinitroso benzene | 1 | 1 | 1 |
| Sulfur | — | 0.5 | 0.5 |
| 2-mercaptobenzothiazole (Captax) | — | 0.3 | 0.3 |

Vulcanization reaction: 30 minutes at 275° F. except compound D which was 50° at 275° F.

EXAMPLE V

A sheet of a soft conformable elastomer of the following formulation:
Isoprene-isobutylene copolymer—100
p-dinitroso benzene—0.6
Calcium Silicate (Silene EF)—50
Clay—100
Phenol-formaldehyde Resin (Amberol ST 137X)—40
Zinc Oxide—5
Stearic Acid—0.5
Sulfur—2
2-mercaptobenzothiazole—0.5
Tetramethyl thiuram disulfide (Methyl Tuads)—1

EXAMPLE VI

A sheet of a soft conformable elastomer of the following formulation:
Isoprene-isobutylene copolymer—60
Low m.w. polyisobutylene (Vistanex LM)—20
High m.w. polyisobutylene (Vistanex MM)—20
Hydrated Silica (Hi-Sil 233)—10
Zinc Oxide—5
Phenol-formaldehyde Resin (Amberol St-137 X)—10
Paraffinic Process Oil (Sunpar)—8
Sulfur—1.5
Tetramethyl thiuram disulfide (Methyl Tuads)—3
Benzothiazyl Disulfide (Altax)—1

EXAMPLE VII

A sheet of a soft conformable elastomer of the following formulation:
Polychloroprene (Neoprene AC)—100
Coumarone-Indene Resin (Neville R-12)—15
Litharge—20
Magnesium Oxide—4
Zinc Oxide—5
Calcium Silicate (Silene EF)—15
Sulfur—4
Phenyl alpha Naphthylamine (Neozone A)—2
Stearic Acid—1
Butyraldehyde-butyl amine reaction product (Accelerator 833)—3

EXAMPLE VIII

A sheet of a soft conformable elastomer of the following formulation:
Polychloroprene (Neoprene FB)—100
Phenyl alpha naphthylamine (Neozone A)—2
Zinc Oxide—10
Clay—100
Dioctyl Sebacate—50
Butraldehyde-butyl amine reaction product (Accelerator 833)—8

EXAMPLE IX

A sheet of a soft conformable elastomer of the following formulation:
Acrylonitrile Butadiene Copolymer (Chemigum N 5)—100
Hydrated Silica (Hi-Sil 233)—15
Zinc Oxide—5
Phenol-Formaldehyde Resin (Durez 11078)—66
Sulfur—1.5
Benzothiazyl Disulfide (Altax)—1.5
Hexamethylene Tetramine—6.6

EXAMPLE X

A sheet of a soft conformable elastomer of the following formulation:
Acrylonitrile Butadiene Copolymer (Hycar 1022)—100
Zinc Oxide—5
Whiting (Calcium Carbonate)—50
Phenol-Formaldehyde Resin (Novolac type)—75
High m.w. Polyester Plasticizer (Paraplex G25)—10
Semi-Reinforcing Furnace Carbon Black—20
Sulfur—3
Benzothiazyl Disulfide (Altax)—1
Trimethyl Dihydroquinoline (Agerite Res. D)—2
Stearic Acid—0.5

EXAMPLE XI

A sheet of a soft conformable elastomer of the following formulation:
Acrylonitrile Butadiene Copolymer (Paracril BJ)—100
Zinc Oxide—15
EPC (Easy Process Channel) Carbon Black—50
Diphenyl Amin-Acetone Reaction Product (Aminox)—2
25° C. Coumarone-Indene Resin—25
Phenol-Formaldehyde Resin (Durez 12687)—20
Sulfur—2
Mercapto Benzothiazole (Captax)—2

EXAMPLE XII

A sheet of a soft conformable elastomer of the following formulation:
Liquid Polysulfide Rubber (Thiokol LP-2)—100
Semi-Reinforcing Furnace Carbon Black (SRF)—30
Phenol-Formaldehyde Resin (Durez 10694)—5
Dispersion of 50 parts lead dioxide in 45 parts dibutyl phthalate and 5 parts stearic acid (Accelerator C-5)—15
Sulfur—0.1
Stearic Acid—1
Thiokol LP-2 is made by reacting bis-chloroethyl formal with sodium polysulfide and cross-linking with trichloropropane.

EXAMPLE XIII

A sheet of a soft conformable elastomer of the following formulation:
5413B—274
NORDEL 1070 (Ethylene Propylene Terpolymer)—100
Zinc Oxide—5
Stearic Acid—3
FEF Black—50
MT Black—75
Atomite Whiting (Calcium Carbonate)—25
Arizona Tackifier No. 27—30
Vistanex LM-MS—25
Sumpar 2280 (Petroleum Oil)—150
Sulfur—0.15
MBT—0.25
THIONEX—0.25

In the foregoing specification we have set out certain preferred practices and embodiments of our invention, however, it will be clear that the invention may be otherwise embodied within the scope of the following claims.

We claim:

1. A wire splice insulator comprising a pair of substantially rigid flat base members in side by side relationship, a sheet of soft conformable self-sealing cohesive elastomer beneath and adhered to said base members, a dome extending outwardly from each said base member and elastomer sheet generally centrally of the base member and forming a cavity in the base member and elastomer sheet, a plurality of semi-tubular sheaths in each base member and elastomer sheet extending from the dome to adjacent the edge of the base members and forming semi-cylindrical cavities in said base members and sheets, said domes and tubular sheaths in the pair of base members being mirror images of each other, a soft non-hardening mastic adhesive insulating material filling the cavities in the elastomer and a parting sheet on the elastomer sheet and mastic opposite the base members, said insulator forming on folding the base members and elastomer sheet together a unitary insulated and sealed whole.

2. A wire splice insulator as claimed in claim 1 wherein the two base members are separated by a zone of weakening forming a hinge between them.

3. A wire splice insulator as claimed in claim 1 wherein said base sheets are of generally rectangular form and the elastomer sheet is of rectangular form extending beyond both sheets on all sides.

4. A wire splice insulator as claimed in claim 1 wherein the elastomer sheet is a member selected from the group consisting of natural rubber, styrene butadiene rubber, butyl rubber, neoprene, nitrite rubber, ethylene propylene terpolymer and polysulfide rubber with sufficient tackifiers to maintain the same in a soft tacky condition.

5. A wire splice insulator as claimed in claim 1 wherein the base member is selected from the group consisting of polyethylene, polypropylene, polyvinylchloride, polycarbonate, cellulose acetate, cellulose butyrate, polyester, polystytrene, polyolefin, polyethylene copolymer, mixtures of copolymers of ethylene and propylene alone and with polyisobutylene.

6. A wire splice assembly of a plurality of insulated wires comprising a plurality of insulated wires having bared portions joined together at a point and an insulating shield covering said joined bare portions and adhered to the insulation of said wires, said insulating shield including a pair of opposed rigid base members in face to face relationship on opposed sides of said splice, a sheet of soft conformable elastomer extending across the two base members, self-adhered around the splice, a dome in each base member and elastomer sheet extending outwardly around the splice and covering the same, a pluarlity of semi-tubular cavities in said base members and elastomer sheets surrounding each wire and a soft non-hardening mastic adhesive filling the domes and cavities around the splice and wires to form an adherent waterproof insulating seal in a protective insulating unitary whole.

* * * * *